United States Patent [19]
Tang et al.

[11] Patent Number: 5,712,829
[45] Date of Patent: Jan. 27, 1998

[54] METHOD FOR DETERMINING EARTH FORMATION SHEAR WAVE ANISOTROPY PARAMETERS BY INVERSION PROCESSING OF SIGNALS FROM A MULTIPLE-COMPONENT DIPOLE ARRAY ACOUSTIC WELL LOGGING INSTRUMENT

[75] Inventors: Xiaoming Tang, Sugarland; Raghu K. Chunduru, Houston, both of Tex.

[73] Assignee: Western Atlas International, Inc., Houston, Tex.

[21] Appl. No.: 696,668

[22] Filed: Aug. 14, 1996

[51] Int. Cl.$^6$ .................. G01V 1/40; G01V 1/28
[52] U.S. Cl. .................. 367/75; 367/25; 367/31
[58] Field of Search .................. 367/25, 31, 75

[56] References Cited

U.S. PATENT DOCUMENTS

| | | | |
|---|---|---|---|
| 4,794,572 | 12/1988 | Sondergeld et al. | 367/31 |
| 4,817,061 | 3/1989 | Alford et al. | 367/75 |
| 5,214,613 | 5/1993 | Esmersoy | 367/31 |

OTHER PUBLICATIONS

Thomsen, L., "Reflection Seismology Over Azimuthally Anisotropic Media", Geophysics, vol. 53, p. 304–313 Mar. 1988.

Esmersoy, C., "Dipole Shear Anisotropy Logging", Expanded Abstracts of the 64th Annual Meeting, Society of Exploration Geophysicists, pp. 1138–1142 1994.

Multiple Array Acoustilog (brochure), Western Atlas Logging Services, Houston, Texas 1994.

Cheng et al, "Decomposition and Particle Motion of Acoustic Dipole Log in Anisotropic Formation", Expanded Abstracts of the 65th Annual Meeting, Society of Exploration Geophysicists, pp. 1–4 1995.

Ingberg, L., "Very Fast Simmulated Reannealing", Journal of Mathematical Computing, No. 12, pp. 967–973 1989.

*Primary Examiner*—Ian J. Lobo
*Attorney, Agent, or Firm*—Richard A. Fagin

[57] ABSTRACT

A method for determining orientations and velocities of slow and fast waves in an anisotropic earth formation. Signals are used from an acoustic logging tool including dipole transmitters and receiver arrays. An initial value of angle subtended between orientation of the fast wave and one of the transmitters is selected. A waveform of a fast principal wave and slow principal wave at first and second selected receiver positions are calculated from received signals at each of these positions and the selected subtended angle. A derivative waveform with respect to subtended angle is calculated for both fast and slow principal waves. An initial velocity of slow waves is selected and the calculated waveforms of the slow principal wave and its derivative waveform at the first position are time shifted by a time corresponding to distance between first and second receiver positions and the selected value of velocity. A value of difference in velocity between slow waves and fast waves is selected, and the time-shifted slow principal wave and its derivative waveform are adjusted by a time corresponding to the value of difference in velocities. Differences between the time-adjusted wave and its derivative waveform are determined between the calculated fast principal wave and its derivative waveform calculated at that receiver position. The value of velocity, value of difference in velocity and subtended angle are adjusted and calculating waveforms and derivative waveforms, time shifting and time adjusting are repeated until the difference between waveforms reaches a minimum.

30 Claims, 2 Drawing Sheets

METHOD FOR DETERMINING EARTH FORMATION SHEAR WAVE ANISOTROPY PARAMETERS BY INVERSION PROCESSING OF SIGNALS FROM A MULTIPLE-COMPONENT DIPOLE ARRAY ACOUSTIC WELL LOGGING INSTRUMENT

BACKGROUND OF THE INVENTION

1. Field of the Invention

The invention is related to the field of acoustic velocity well logging. More specifically, the invention is related to methods of processing receiver signals from an acoustic well logging instrument to determine certain shear wave propagation properties of earth formations.

2. Description of the Related Art

Methods of exploration for petroleum reservoirs include reflection seismology. Accurate interpretation of data acquired by reflection seismic techniques generally requires accurate knowledge of the acoustic energy propagation velocities of the earth formations through which seismic energy is propagated. Methods known in the art for determining the acoustic velocity of the earth formations include acoustic velocity well logging, wherein an acoustic well logging instrument is inserted into wellbores drilled through the earth formations.

It has been observed that certain earth formations exhibit a property called "azimuthal anisotropy", wherein the velocity of acoustic energy propagating in one direction within a particular earth formation may be somewhat different than the velocity of acoustic energy propagating in a different direction within the same earth formation. See, for example, L. Thomsen, *Reflection Seismology Over Azimuthally Anisotropic Media*, Geophysics, vol. 53, no. pp. 304–313, Society of Exploration Geophysicists, 1988. Azimuthal anisotropy is particularly of interest in the measurement of the velocity of shear waves propagating in the earth formations. Acoustic well logging techniques have been devised for determining the amount of anisotropy in the formation shear wave velocity. The amount of anisotropy is generally defined as the difference between the velocities of the fast and the slow shear waves known to exist in the anisotropic formation. Other techniques can be used to estimate the relative orientation of the directions within the earth formation of the fast and slow shear waves. See, for example, C. Esmersoy et al, *Dipole Shear Anisotropy Logging*, expanded abstracts of the 64th annula meeting, Society of Exploration Geophysicists, pp. 1138–1142 (1994).

The techniques known in the art for determining the velocities of the fast and slow shear waves, and the relative polarization of each, are based on several assumptions. First, it is assumed that the anisotropy is along directions substantially axially perpendicular to a wellbore drilled through the earth formations. Second, it is assumed that the anisotropy generally includes a single principal direction of the fast shear wave polarization and a single principal direction of the slow shear wave polarization. The principal directions of the fast and slow shear waves are further assumed to be azimuthally separated by 90 degrees. These assumptions are based on synthetic modelling and on laboratory experiment, and have been shown by field experience to be valid for certain acoustically anisotropic earth formations.

To measure the velocities of the fast and slow shear waves in anisotropic earth formations, the acoustic well logging instrument typically includes dipole transmitters and dipole receivers axially spaced apart from the transmitters. See for example, *Multipole Array Acoustilog*, Western Atlas Logging Services, Houston, Tex., 1994. The acoustic well logging instrument is further configured so that the dipole transmitters are oriented at right angles (90 degrees) with respect to each other. Some of the receivers are oriented to be axially parallel to one of the dipole transmitters, and other receivers are oriented to be axially parallel to the other dipole transmitter. The transmitters are periodically, alternately energized to emit acoustic energy impulses into the wellbore. Some of the acoustic energy propagates along the wellbore wall as a flexural wave, substantially at the shear velocity of the earth formation, and later is detected by the dipole receivers. If the earth formation is anisotropic according to the previously stated assumptions, some of the energy will propagate at the fast velocity and some of the energy will propagate at the slow velocity. The amount of the energy which reaches receivers on each axial orientation depends on the relative orientation of the fast and slow shear wave polarization directions with respect to the axes of the transmitters and receivers.

A method of estimating the relative polarization orientations is described, for example, in U.S. Pat. No. 4,817,061 issued to Alford et al. For convenience of the following description, one of the transmitters will be referred to as the X transmitter, and the other transmitter will be referred to as the Y transmitter. Signals detected by the receivers axially parallel to the X transmitter which are detected when energizing the X transmitter are referred to as XX signals. Similarly, signals from the receivers axially parallel to the Y transmitter detected when the Y transmitter is energized are referred to as YY signals. Cross-component signals can also be detected by the axially perpendicular receivers when each transmitter is energized, and these signals are referred to as the XY and YX signals for when the X and Y transmitters, respectively, are energized. Each of the four sets of signals can be represented as a time series, each of which consists of a series of numbers indexed with respect to increasing time from the instant at which the respective transmitter is energized. The ordinate value in each series of numbers represents amplitude of the signal. The solution to the anisotropy system can be represented by a time series of the principal flexural wave at the fast velocity FP(t), and a time series of the principal flexural wave at the slow velocity SP(t). FP(t) and SP(t) are oriented at, respectively, the formation fast and slow shear wave polarization directions, and are assumed to be oriented at right angles to each other. The solution to the orientation of FP(t) and SP(t) includes an angle, $\theta$, subtended between the axis of one of the transmitters (for convenience, the X transmitter) and the polarization direction of the fast velocity. The solution using the methods known in the art are based on the relationships:

$$FP(t)=\cos^2(\theta)XX(t)+\sin(\theta)\cos(\theta)[XY(t)+YX(t)]+\sin^2(\theta)YY(t) \quad SP(t)= \sin^2(\theta)XX(t)-\sin(\theta)\cos(\theta)[XY(t)+YX(t)]+\cos^2(\theta)YY(t) \quad (1)$$

where $\theta$ can be determined by solving the following expression:

$$\sin(2\theta)[XX(t)-YY(t)]-\cos(2\theta)[XY(t)+YX(t)]=0 \quad (2)$$

In practice, the solution for $\theta$ from equation (2) is substituted into equation (1) to determine the time series for the fast and slow principal flexural waves, FP(t) and SP(t), respectively.

A drawback to the method of Alford et al is that the solution for $\theta$ is ambiguous. Equation (2) is satisfied both by $\theta$ and by the value $\theta+90°$. The ambiguity can be resolved by deriving velocity by processing the principal wave series along the length of the entire set of receivers in the acoustic well logging tool. See the Esmersoy reference, supra. If the velocity thus calculated for FP(t) is smaller than that calculated for SP(t), then it can be assumed that the relative orientation is rotated by the 90° offset as previously described. The problem with resolving the directional ambiguity this way is that the magnitude of the anisotropy (the difference between the fast and slow principal wave velocities) is often smaller than the magnitude of error included in the determination of the velocity. The velocity determination errors can be the result of factors such as dispersion effects on the dipole energy and poor quality signals.

The invention is intended to improve the reliability and accuracy with which the direction and magnitude of the anisotropy can be determined.

SUMMARY OF THE INVENTION

The invention is a method for determining the orientations and the velocities of slow shear waves and fast shear waves in an azimuthally anisotropic earth formation. Signals are used from an acoustic well logging tool. The tool includes dipole acoustic transmitters and arrays of dipole acoustic receivers at axially spaced apart positions. The transmitters are oriented at known angles with respect to each other, and one of the arrays of receivers is oriented in the same direction as each one of the transmitters. An initial value of an angle subtended between the orientation of the fast shear wave and one of the transmitters is selected. A waveform of a fast principal wave and a slow principal wave for a first axial receiver position and second selected axial receiver position are calculated from received signals at each of the axial receiver positions and the selected initial value of the subtended angle. A derivative waveform, with respect to the subtended angle is also calculated for both the fast and the slow principal waves thus calculated. An initial value of the velocity of the slow waves is selected, and the calculated waveforms of the slow principal wave and its derivative waveform for the first axial receiver position are time shifted by a time corresponding to the axial distance between the first and the second axial receiver positions, and the selected initial value of velocity of the slow wave. An initial value of the difference in velocity between slow waves and fast waves is selected, and the time-shifted slow principal wave and its derivative waveform are adjusted by a time corresponding to the initial value of difference in velocities. Differences between the time-adjusted wave and its derivative waveform are determined, respectively, between the calculated fast principal wave and its derivative waveform calculated at the second axial receiver position. The value of velocity, value of difference in velocity and the value of the subtended angle are adjusted and the steps of calculating the waveforms and the derivative waveforms, time shifting and time adjusting are repeated until the difference between the time adjusted waveforms and the calculated waveforms and their respective derivative functions at the second axial receiver location reaches a minimum value.

In a preferred embodiment, the step of adjusting the values of velocity, angle and difference in velocities is performed to minimize the value of an object function. In a specific embodiment, the object function is minimized using a very fast simulated annealing algorithm.

DESCRIPTION OF THE PREFERRED EMBODIMENT

Figure 1:
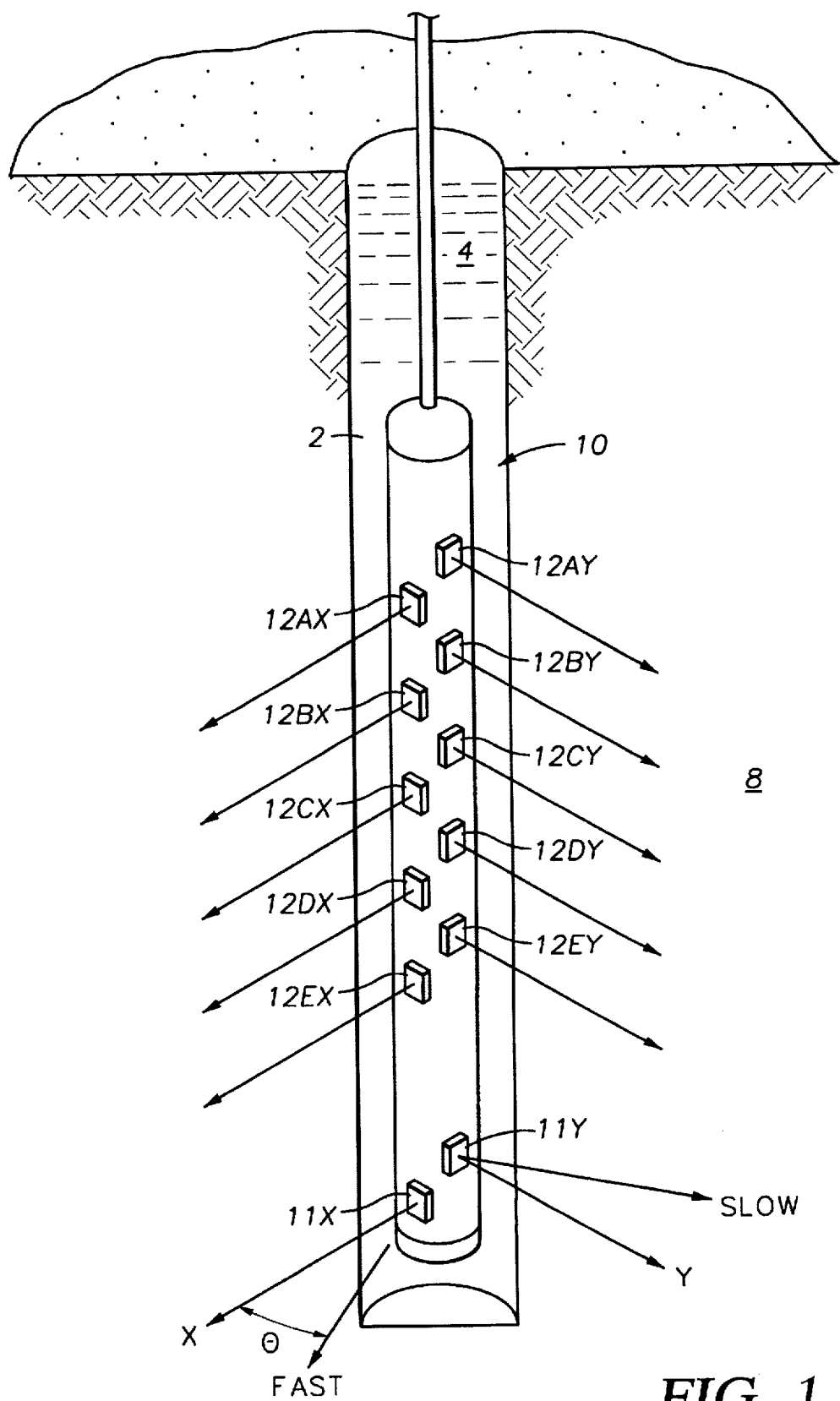
FIG. 1 shows orientations of dipole transmitters and receivers on a dipole acoustic well logging instrument.

An acoustic well logging instrument which can generate signals suitable for the invention is described in the *Multipole Array Acoustilog* reference cited in the Background section herein. The instrument described in this reference includes dipole transmitters and a plurality of dipole receivers positioned at axially spaced apart locations from the transmitters. A representation of this instrument is shown in FIG. 1. When the instrument 10 shown in FIG. 1 is configured to acquire signals used in the method of the invention, one dipole transmitter 11X can be oriented to have its energy output directed along an axis indicated by X. Another dipole transmitter, shown at 11Y, is typically oriented to have its energy output directed along an axis indicated by Y. Axis Y is typically perpendicular to axis X. The dipole receivers positioned at axially spaced apart locations along the instrument 10 can be aligned in two arrays. One array, consists of receivers 12AX–12EX, the principal sensitive directions of which are aligned substantially parallel to axis X. The other array consists of receivers 12AY–12EY, the principal sensitive directions of which are aligned substantially parallel to axis Y. The instrument 10 in FIG. 1 is shown as having arrays including five receivers oriented along each of the X and Y axes, but the number of receivers in FIG. 1 is shown only as an example and is not meant to limit the invention. The instrument described in the *Multipole Array Acoustilog* reference, for example, can include eight receivers oriented along each axis X, Y. In the description of the invention to follow, the axial location of the individual receivers, 12AX–12EX and 12AY–12EY, along the instrument 10 will be referred to as axial receiver positions. In the instrument described in the *Multipole Array Acoustilog* reference, supra, there can be a small axial spacing between the X-oriented receiver at one axial receiver position and the Y-oriented receiver at the same axial receiver position. These axial spacings are typically compensated during signal processing, and so for the purposes of the invention the X and Y receivers at the same axial position (for example 12AX and 12AY) can be considered to have zero axial spacing between them and each have the same axial spacing from the transmitters 11X, 11Y. Similarly, the transmitters 11X, 11Y are slightly axially spaced apart, but this spacing can be ignored for purposes of the invention.

During acquisition of acoustic signals, the instrument 10 is inserted into a wellbore 2 drilled through earth formations, shown generally at 8. The wellbore 2 is typically filled with a liquid 4 for signal acquisition with acoustic well logging instruments. The transmitters 11X, 11Y are periodically, individually activated. When a transmitter 11X, or 11Y is activated, acoustic energy propagates through the liquid 4, along the wall of the wellbore 2, and is eventually detected by the receivers 12AX–12EX and 12AY–12EY. If the formation 8 is azimuthally anisotropic, the energy emanating from the transmitters 11X, 11Y will tend ultimately to travel along two axes, indicated by FAST and SLOW. The FAST and SLOW axes in typical azimuthally anisotropic earth formations are separated by an angle of 90 degrees. Acoustic energy travels at the fast velocity, related to the magnitude of the anisotropy, along the FAST axis, and the acoustic energy travels at the slow velocity, related to the magnitude of the anisotropy, along the SLOW axis. The acoustic energy can be thought of as travelling along the wellbore wall in the form of "fast waves" and "slow waves". If the particular transmitter which is energized is oriented along the FAST axis, then substantially all the acoustic energy will travel as fast waves. If this same transmitter were oriented along the SLOW axis, then substantially all the acoustic energy would travel as slow waves. At any intermediate transmitter orientation, the energy travelling along the wall of the wellbore will consist of a composite of fast waves and slow waves, having relative magnitudes in the composite wave depending on the orientation of the transmitter with respect to the FAST and SLOW axes.

For convenience of the explanation of the invention, an angle subtended between axis X and the FAST axis will be designated θ. In order to be able to determine the relative orientation between the FAST and SLOW axes and a geographic reference, such as magnetic north, an orientation sensor unit (not shown in FIG. 1 for clarity of the illustration) can be included with the instrument 10. The orientation sensor unit (not shown) typically includes magnetometers and accelerometers whose individual measurements can be combined using methods known in the art to calculate the orientation of axis X with respect to magnetic north and inclination from vertical (gravity). By determining θ, after determining the orientation of axis X with respect to magnetic north and vertical, the orientation of the FAST and SLOW axes with respect to magnetic north can also be determined.

The receivers 12AX-12EX and 12AY-12EY typically generate electrical voltages proportional in magnitude to the amplitude of the acoustic energy detected. The instrument 10 can include signal processing electronics (not shown) to convert these electrical voltages into a format where they may be transmitted to the earth's surface, or alternatively may be stored in a recording device (not shown) in the instrument for later processing according to the invention. Various types of signal processing electronics are well known in the art which can perform both the format conversion/transmission and signal storage functions.

The invention is intended to determine the fast velocity, the slow velocity and the azimuthal directions of each velocity with respect to the orientation of the X axis (the angle θ). To process the signals according to the invention, it is convenient to represent the signals detected in each receiver (the electrical voltages) as a "time series". Time series typically consist of ordered pairs of numbers including time as one value in each ordered pair, and the magnitude of the signal as the other value in each ordered pair. Typically the time value between successive ordered pairs is separated by an even increment, although this is not a limitation of the time value in the ordered pairs. The time series representation of each signal becomes particularly convenient when using well known signal processing electronics which digitize the electrical voltages generated by each receiver in response to the acoustic energy. In this case, the time value in each ordered pair can directly correspond to the time at which each digital signal sample was made, or alternatively can correspond to selected ones of the digital signal samples.

Signals from the receivers (12AX-12EX) oriented axially parallel to transmitter 11X, which are detected when energizing transmitter 11X are referred to as XX signals. Similarly, signals from the receivers (12AY-12EY) oriented axially parallel to transmitter 11Y, detected when transmitter 11Y is energized are referred to as YY signals. Cross-component signals can also be detected by the receivers which are axially perpendicular to the particular transmitter when that transmitter is energized, and these signals are referred to as the XY and YX signals, detected when transmitters 11X and 11Y, respectively, are energized. The time series for each set of signals can be represented by XX(t), YY(t), XY(t) and YX(t), wherein the time value in each ordered pair can represent the elapsed time from the instant at which the respective transmitter is energized. The time series notation for the receiver signals as just described refers specifically to those signals detected at one individual axial receiver position. Corresponding XX(t), YY(t), XY(t) and YX(t) time series can be generated for the two receivers located at each axial receiver position on the instrument 10.

It is to be explicitly understood that the relative orientation of the receivers and transmitters on the instrument 10 does not limit the invention. As will become apparent from the following description of the method of the invention, it is only necessary that the angle subtended between the receiver arrays and between the transmitters be known in order to practice the invention. Orienting the transmitters and receivers as shown on the instrument 10 in FIG. 1, however, is preferred because it provides the most convenient trigonometric calculations for certain intermediate steps in the method of the invention, and provides the highest degree of resolution to the results.

The first step in the method of the invention is to select an initial value of θ, which can be selected arbitrarily from the possible range of values between zero and 180 degrees. The signals measured by the receivers at each axial receiver position in response to the acoustic energy from the transmitters 11X, 11Y, can be designated XX(t), YY(t), XY(t) and YX(t), as previously explained. These signals can be used to calculate an initial estimated time series for a fast principal wave, FP(t), and for a slow principal wave, SP(t), corresponding to each axial receiver position. The time series FP(t) and SP(t) at each axial receiver position are related to the time series of each of the four sets of detected signals at each axial receiver position, and to θ, by the following expressions:

$$FP(t) = \cos^2(\theta)XX(t) + \sin(\theta)\cos(\theta)[XY(t)+YX(t)] + \sin^2(\theta)YY(t)$$
$$SP(t) = \sin^2(\theta)XX(t) - \sin(\theta)\cos(\theta)[XY(t)+YX(t)] + \cos^2(\theta)YY(t) \quad (3)$$

Next, derivative functions of each of the initial time series FP(t) and SP(O with respect to the subtended angle θ can be calculated for the same four received signals at each axial receiver position. These derivative functions can be expressed as:

$$\frac{\partial FP(t)}{\partial \theta} = -\sin(2\theta)[XX(t) - YY(t)] + \cos(2\theta)[XY(t) + YX(t)] \quad (4)$$

$$\frac{\partial SP(t)}{\partial \theta} = \sin(2\theta)[XX(t) - YY(t)] - \cos(2\theta)[XY(t) + YX(t)]$$

If the transmitters and the receivers are all positioned within an earth formation having substantially uniform acoustic properties along the entire span between the transmitters and the most distal of the receivers, a waveform of a flexural acoustic wave detected at one receiver, travelling at the slow velocity, could be made to substantially match the waveform of a flexural acoustic wave travelling to the same receiver at the fast velocity merely by applying a time shift related to the difference between the fast and the slow velocities. The substantial match in the waveforms of the energy travelling at the fast and at the slow velocities has been determined by numerical modelling experiments. See for example, N. Y. Cheng and C. H. Cheng, *Decomposition and Particle Motion of Acoustic Dipole Log in Anisotropic Formation*, expanded abstracts, 65th annual meeting, Society of Exploration Geophysicists, 1995, pp 1–4. As a matter of convenience, the fast and slow velocities can be represented in this explanation in terms of their reciprocals, called slowness, as $s_1$ and $s_2$ for the fast and slow velocities, respectively. $\delta_s$ represents the difference between these slowness values (equal to $s_1$-$s_2$), and can be referred to as the magnitude of anisotropy. For a particular axial receiver position, referenced by the index number m, (where m can be in the range of 1 to N, and N represents the total number of axial receiver positions on the instrument 10) the waveform of the flexural acoustic at the fast velocity can be expressed as a time series in terms of the waveform of a flexural wave travelling at the slow velocity by the expression:

$$SP_m(t+\delta s\, z_m) = FP_m(t) \quad (5)$$

where $z_m$ represents the axial spacing between receiver position m and the transmitter. The derivative functions of the fast principal wave and the slow principal wave at receiver position m will be similarly related, and can be determined by the expression:

$$\frac{\partial SP_m(t+\delta s\, z_m)}{\partial \theta} = \frac{\partial FP_m(t)}{\partial \theta} \quad (6)$$

An initial value of $s_2$ can be selected from a range including known values of shear velocity for earth formations. The value of $s_2$ can then be applied, in combination with the axial spacing between the m receiver position and another arbitrarily chosen receiver position, referred to by index letter n, to calculate a time delay. The time delay is applied to the initial estimate of the slow principal wave calculated for receiver position n by equation (3) to calculate a synthetic slow principal wave at receiver position m. A synthetic derivative function of the slow principal wave for receiver position m can be calculated by applying the same value of time delay to the derivative function of the slow principal wave for receiver level n as calculated by equation (4).

Next, a synthetic fast principal wave and a synthetic derivative function of the fast principal wave can be calculated for receiver position m according to the expressions in equations (5) and (6) using an initial estimate of as which can be selected from known values of anisotropy magnitude of earth formations. The synthetic fast principal wave and the synthetic derivative function of the fast principal wave thus calculated for receiver position m can then be compared to the fast principal wave and the derivative function of the fast principal wave calculated for receiver position n according to the expressions in equations (3) and (4), this principal wave and its derivative function being calculated from the four receiver signals at that receiver position.

The time delay is related to the slowness of the slow principal wave $s_2$, and the difference in axial spacing (from the transmitter) between receiver position n and receiver position m, this distance being designated (m-n)$\delta z$, where $\delta z$ represents the axial spacing between adjacent receiver positions. The values of $s_2$ and $\delta s$ are used to calculate the synthetic fast principal wave at receiver position m. If the values $\delta_2$ and $\delta s$ are correct, then the waveform of the fast principal wave should substantially match the waveform of the synthetic fast principal wave calculated for receiver position m after adding the time delay and the time adjustment. This relationship can be expressed as:

$$SP_n[t-s_2(m-n)\delta z+\delta sz_m] = FP_m(t) \quad (7)$$

This relationship also applies to the derivative functions of these waveforms, and can be shown as:

$$\frac{\partial}{\partial \theta} SP_n[t-s_2(m-n)\delta z+\delta sz_m] = \frac{\partial FP_m(t)}{\partial \theta} \quad (8)$$

The invention improves the accuracy of estimation of velocities, subtended angle and anisotropy magnitude by performing the steps of calculating time delay and time adjustment to generate a synthetic fast principal waveform and synthetic derivative function of the fast principal waveform for all the other available axial receiver positions relative to receiver position m. The entire process is then repeated using every other axial receiver position in the instrument 10 as the base to which to perform the time shifting and time adjusting to compare waveforms.

The slowness (inverse velocity) of the slow principal wave, $s_2$, the difference between the slow and fast inverse velocities ($s_1$-$s_2$, which is equal to $\delta s$), and the subtended angle, $\theta$, can then be simultaneously solved by minimizing an objective function in the form:

$$E(s_2, \delta s, \theta) = \sum_{m,n=1}^{N} \int_T \{SP_n[t-s_2(m-n)\delta z+\delta sz_m] - FP_m(t)\}^2 dt + \quad (9)$$

$$\sum_{m,n=1}^{N} \int_T \left\{ \frac{\partial}{\partial \theta} SP_n[t-s_2(m-n)\delta z+\delta sz_m] - \frac{\partial}{\partial \theta} FP_m(t) \right\}^2 dt$$

where T represents a time window duration during which the waveforms are matched, and N represents, as previously explained, the total number of receivers in the instrument 10. The time window duration can be selected to exclude time intervals during which signal detected by the receivers are unlikely to result from dipole waves propagating along the wall of the wellbore (2 in FIG. 1). The summations in equation (9) include N×N waveform pairs. Using the instrument described in the *Multipole Array Acoustilog* reference, supra, the number of waveform pairs would be 8×8=64. The large number of waveform pairs included in the minimization for a typical well logging instrument substantially reduces the effects of noise in the individual receiver signals and enhances the accuracy of the estimation of fast and slow velocities, and the subtended angle.

The process of the invention, by simultaneously determining fast and slow velocities, and the subtended angle, has the advantage of removing the angular ambiguity of the solutions of the prior art because the minimization can be directed only to include values of $\delta s$ greater than or equal to zero. In this way, the velocity of the fast principal wave will always be greater than or equal to the velocity of the slow principal wave, so that the subtended angle thus determined should correspond to the direction of the fast velocity.

In the preferred embodiment of the invention, the minimization method includes a so called "global" optimization routine referred to as a very fast simulated annealing algorithm, such as described in L. Ingber, *Very Fast Simulated Reannealing*, Mathematical Computing, no. 12 (1989), pp. 967-973. The optimization method disclosed herein is not meant to limit the invention, as other methods of optimization known in the art could be used.

Figure 2:
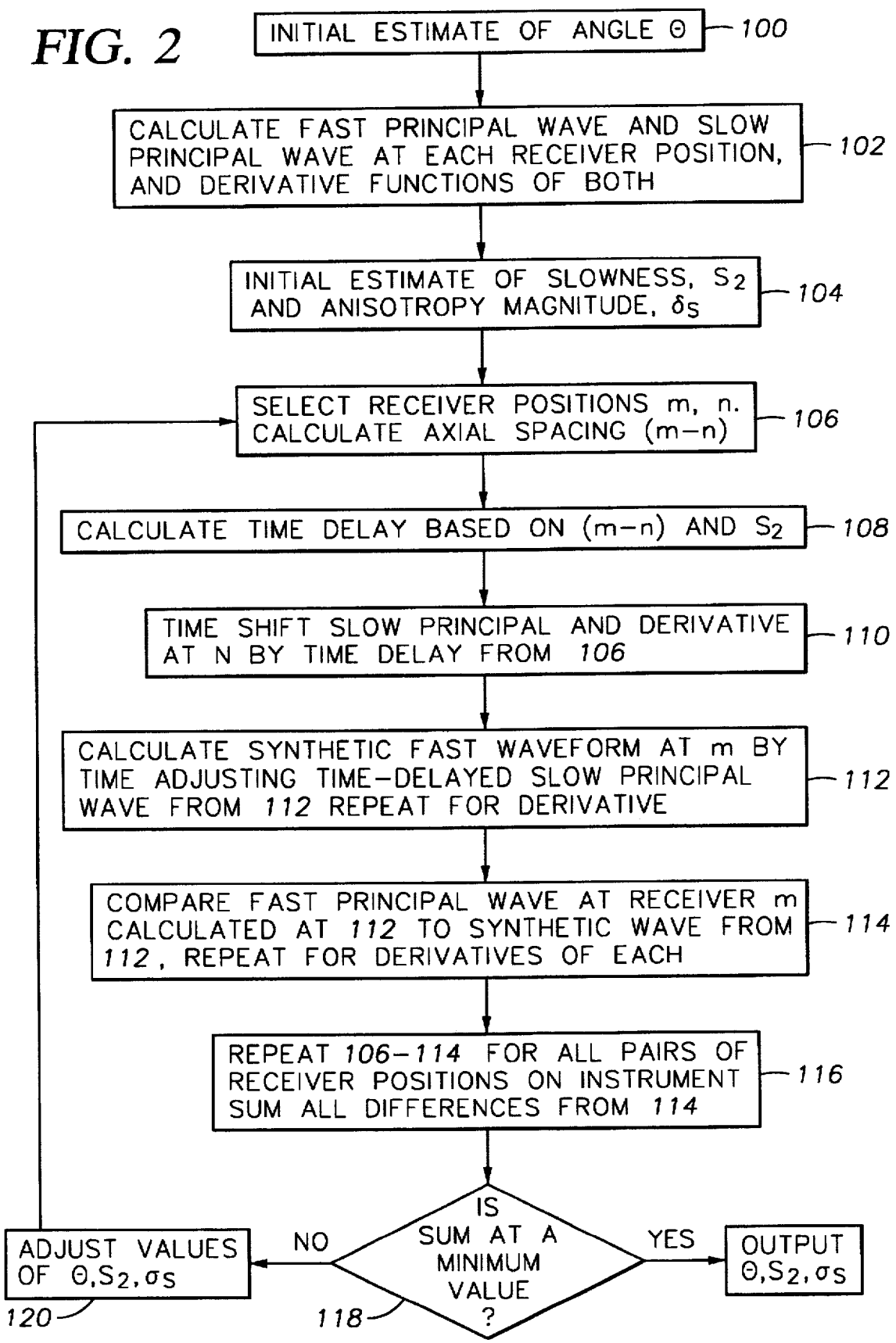
FIG. 2 shows a flow chart of the method of the invention.

FIG. 2 shows a flow chart of the process of the invention. The initial estimate of $\theta$ is shown at 100. At 102, the fast and slow principal waves, and their respective derivative functions, are calculated for each axial receiver position based on the receiver signals from each position and the initial estimate of $\theta$. Initial estimates of slow velocity $s_2$ and anisotropy magnitude $\delta s$ are shown at 104. Receiver positions m and n can be selected at 106. Time delay calculation based on the axial spacing between receiver positions m and n and the initial estimate of slow velocity is shown at 108. At 110, the time delay is applied to time-shift the slow principal wave and its derivative function. A synthetic fast principal wave and its derivative function are calculated by applying a time adjustment to the previously time-shifted slow principal wave (and its derivative function) based on the initial estimate of anisotropy magnitude, which is shown at 112. At 114, the synthetic fast principal wave is compared to the fast principal wave calculated from the receiver signals, and at 116 the process in steps 106 through 114 is repeated for a plurality of combinations, or for every possible combination, of pairs of receiver positions on the instrument (10 in FIG. 1). The differences between fast principal waves and synthetic fast waves (and their derivative functions) from each of the pairs of receiver locations are summed at 116. If the sum of all the differences from each pair of receiver positions reaches a global minimum, as shown at step 118, the process ends, and the values of $\theta$, $s_2$, and $\delta s$ can be output. If the sum is not at a global minimum, the values of $\theta$, $s_2$ and $\delta s$ can be adjusted and steps 106–118 repeated until a global minimum is reached.

DESCRIPTION OF AN ALTERNATIVE EMBODIMENT

In certain circumstances it may be impractical to obtain the cross-component signals XY, and YX. A substitute for the cross-component signals is suggested by the relationship in equation (2) recited in the Background section herein. By substitution of equation (2) into the expressions in equation (1), time series for FP(t) and SP(t) can be expressed in the form:

$$FP(t) = \frac{\cos^2\theta \, XX(t) - \sin^2\theta \, YY(t)}{\cos(2\theta)} \quad (10)$$

$$SP(t) = \frac{\cos^2\theta \, YY(t) - \sin^2\theta \, XX(t)}{\cos(2\theta)}$$

Using the expressions in equation (10) to resolve the velocities and subtended angle has two limitations. First, both $\theta$ and $-\theta$ are solutions to these expressions. This ambiguity cannot be resolved without the use of the cross-component signals. Second, a singularity exists when $\cos(2\theta)=0$. This second limitation can be overcome by modifying the objective function to maximize the value of a cross correlation function between FP(t) and SP(t). This modification includes calculation of RMS amplitudes of both the fast principal wave and the slow principal wave from equation (10). The RMS amplitudes of FP(t) and SP(t) can be represented by FP* and SP*, respectively. Scaling FP(t) and SP(t) by their respective RMS amplitudes enables a solution to be derived using the following objective function, where the singularity at $\cos(2\theta)=0$ is eliminated:

$$E(s_2, \delta s, \theta) = \qquad (11)$$

$$\sum_{m,n=1}^{N} \int_T \left[ \frac{SP_n[t - s_2(m-n)\delta z + \delta s z_m]}{SP^*} - \frac{FP_m(t)}{FP^*} \right]^2 dt$$

While this alternative method will not resolve the subtended angle, $\theta$, this alternative method can be used to calculate estimates of the amount of anisotropy, $\delta s$, without the cross-component signals when they are unavailable.

Another alternative solution can be derived when only a single transmitter is available, for example transmitter 11X, but receiver arrays oriented both parallel to and perpendicular to axis X are available. Assuming, for this solution, that cross-component signals XY would be substantially equal to cross-component signals YX, by substitution into the equations for FP(t) and SP(t) in equation (3), the following expressions can be derived:

$$FP(t)=XX(t)-\tan \theta XY(t) \; SP(t)=XX(t)-\cot \theta XY(t) \qquad (12)$$

The expressions in equation (12) would include singularities at $\theta$ values of zero and ninety degrees. To avoid the singularities it is possible to derive alternative expressions for FP(t) and SP(t), represented as FP(t) and SP(t) as shown in the following expressions:

$$FP^1(t)=\sin \theta \cos \theta FP(t)=\sin \theta \cos \theta XX(t)-\sin^2 \theta XY(t) \; SP^1(t)=\sin$$
$$\theta \cos \theta SP(t)=\sin \theta \cos \theta XX(t)+\cos^2 \theta XY(t) \qquad (13)$$

and an objective function which provides the solution to slow velocity, amount of anisotropy, and subtended angle can be shown by the following expression:

$$E(s_2, \delta s, \theta) = \sum_{m,n=1}^{N} \int_T \{SP_n'(t)[t - s_2(m-n)\delta z + \delta s z_m] - FP_m'(t)\}^2 dt \qquad (14)$$

DESCRIPTION OF A SPECIFIC EMBODIMENT

In the previously described embodiments of the invention, it was assumed that the anisotropy magnitude, $\delta s$, of the earth formation was substantially constant over the entire span between the transmitter and the most distal receiver. For the instrument described in the *Multipole Array Acoustilog* reference, supra, this span can be as long as 13 feet. The slowness, $s_2$, and the subtended angle, $\theta$, however, are determined only within the span comprising the axial spacing between the closest and the most distal receiver, which in the instrument described in the *Multipole Array Acoustilog* reference, supra can be about 3.5 feet. This specific embodiment is intended to improve the resolution of the calculated anisotropy magnitude, $\delta s$, so that it substantially matches the resolution of the calculated slowness, $s_2$, and the subtended angle, $\theta$. The method of improving resolution uses the difference in wave propagation time at any particular receiver between the fast and slow waves. The time difference, $\delta t$, at receiver m, for example can be expressed by:

$$\delta t = \delta s \, z_m \qquad (15)$$

where, as previously explained, $z_m$ represents the axial spacing between the transmitter and receiver m. $\delta t$ can be decomposed into two parts:

$$\delta t = \delta s z_m = \delta t_0 + \delta s'(z_m - z_1) \qquad (16)$$

where $\delta s'$ represents the anisotropy for the earth formation disposed between the nearest and most distal receivers, $z_1$ represents the axial spacing from the transmitter to the closest (first) receiver, and $\delta t_0$ represents the time difference between the fast and slow waves at the first receiver. It is possible to estimate $\delta t_0$ from the average value of $\delta s$ between the transmitter and the first receiver. Using this estimate, it is possible to determine a value of $\delta s$ within the span of the receiver arrays.

Initially an average value of $\delta s$ for the axial span between the transmitter and the first receiver can be determined according to any one of the previous embodiments, depending on which signals are available for processing. $\delta t_0$ can be initially estimated as being equal to $\delta s(z_1)$. By substitution of the following expressions into the solutions of the previous embodiments of the invention:

$$\delta sz_m \to \overline{\delta sz_1} + \delta s'(z_m - z_1) \quad (17)$$

it is possible to calculate the anisotropy of the formation disposed between the receivers $\delta s'$. After each new value of $\delta s'$ is calculated, the new value of $\delta s'$ can be averaged with the previous value of $\delta s'$ to derive a new estimate of the average anisotropy of the formation disposed between the transmitter and the first receiver. Using this process it is possible to estimate anisotropy with substantially the same resolution as the calculations of velocity and subtended angle.

Those skilled in the art will devise other embodiments of this invention which do not depart from the spirit of the invention as described herein. Accordingly, the invention should be limited in scope only by the attached claims.

What is claimed is:

1. A method for determining orientations and velocities of slow shear waves and fast shear waves in an azimuthally anisotropic earth formation by processing signals from a well logging instrument including dipole acoustic transmitters and dipole receivers at axially spaced apart positions from said transmitters, said transmitters oriented at a known angle to each other, a first array of said receivers oriented axially parallel to one of said transmitters, a second array of said receivers oriented axially parallel to another one of said transmitters, said method comprising:

a) selecting an initial value of an angle subtended between said orientation of said fast shear waves and orientation of said one of said transmitters;
   b) calculating a waveform of a fast principal wave and a slow principal wave at first and at second selected axial receiver positions from said initial value of said angle and from acoustic signals received at said axial positions, said received signals corresponding to each combination of receiver and transmitter orientations at each of said first and said second axial positions;
   c) calculating a derivative waveform with respect to said subtended angle of said fast principal wave and said slow principal wave;
   d) selecting an initial value of said velocity of said slow shear waves, and time shifting said calculated waveforms of said slow principal wave and said derivative waveform of said slow principal wave from said first axial position by an amount of time corresponding to axial distance between said first and said second axial receiver positions and said selected initial value of velocity;
   e) selecting an initial value of a difference in velocity between said initial value of said velocity of said slow shear waves and said velocity of said fast shear waves, and time adjusting said time-shifted slow principal, wave and its corresponding derivative waveform by a time value corresponding to said initial value of difference in said velocities, said initial selected value of said velocity of said slow shear waves and a difference in axial spacing from said one of said transmitters between said first axial position and said second axial position;
   f) determining differences between said time-adjusted slow principal wave and its corresponding derivative waveform, and respectively, said calculated fast principal wave and its derivative waveform previously calculated for said second axial position; and
   g) adjusting said initial value of said velocity of said slow shear waves, said initial value of said difference in velocity and said initial value of said subtended angle, and repeating said steps of calculating said waveforms and derivative function waveforms, time shifting said waveforms and said derivative waveforms, time adjusting said timeshifted waveforms and derivative waveforms until said differences determined in step (f) reaches a minimum.

2. The method as defined in claim 1 further comprising performing said steps of time shifting, time adjusting and determining said difference for a plurality of pairs of axial receiver locations.

3. The method as defined in claim 2 further comprising repeating said steps of adjusting said initial value of velocity said initial value of subtended angle and said initial value of difference in velocity and repeating said steps of time shifting, time adjusting and determining said difference until a sum of said differences at all of said plurality of pairs of axial positions reaches a minimum.

4. The method as defined in claim 1 wherein said step of adjusting said initial values comprises minimizing a value of an objective function.

5. The method as defined in claim 4 wherein minimizing said value of said objective function comprises using a very fast simulated annealing algorithm.

6. The method as defined in claim 1 further comprising measuring said orientation of said one of said transmitters with respect to a geographic reference and calculating said orientation of said velocity of said fast shear waves and said slow shear waves with respect to said geographic reference by determining said subtended angle.

7. The method as defined in claim 1 wherein said transmitters are oriented at right angles to each other and said receivers are oriented at right angles to each other.

8. The method as defined in claim 1 further comprising improving resolution of determination of said difference in velocity between said slow shear wave and said fast shear wave by calculating an average value of said difference within an axial span between one of said transmitters and a closest one of said axial receiver positions, and revising said average value each time said value of said difference in velocities is determined.

9. A method for determining orientations and velocities of slow shear waves and fast shear waves in an azimuthally anisotropic earth formation penetrated by a wellbore, comprising:

a) inserting a dipole acoustic well logging tool into said wellbore, said tool comprising dipole acoustic transmitters oriented at known angles with respect to each other and dipole acoustic receivers at axially spaced apart locations along said tool, said receivers oriented in arrays, each of said arrays oriented substantially parallel to one of said transmitters;
   b) selectively energizing said transmitters;
   c) detecting acoustic energy propagated along said wellbore in said receivers, said step of detecting including detecting signals in line with said transmitters and cross-axially to said transmitters;
   d) selecting an initial value of an angle subtended between said orientation of said fast shear waves and orientation of a first one of said transmitters;
   e) calculating a waveform of a fast principal wave and a slow principal wave at first and at second selected axial receiver positions from said initial value of said angle, and from acoustic signals received at said first and second axial positions, said received signals including both said in line and said cross-axial signals;

f) calculating a derivative waveform with respect to said subtended angle of said fast principal wave and said slow principal wave;

g) selecting an initial value of said velocity of said slow shear waves, and time shifting said calculated waveforms of said slow principal wave and its corresponding derivative waveform from said first axial position by an amount of time corresponding to an axial distance between said first and said second axial receiver positions and said selected initial value of velocity;

h) selecting an initial value of difference in velocity between said initial velocity of said slow shear waves and said velocity of said fast shear waves, and time adjusting said time-shifted slow principal wave and its corresponding derivative waveform by a time value corresponding to said initial value of difference in said velocities, said initial selected value of said velocity of said slow shear waves and a difference in axial spacing from said one of said transmitters between said first axial position and said second axial position;

i) determining differences between said time-adjusted slow principal wave and its corresponding derivative waveform; and respectively, said calculated fast principal wave and its derivative waveform previously calculated for said second axial position; and j) adjusting said initial value of said velocity of said slow shear waves, said initial value of said difference in velocity and said initial value of said subtended angle, and repeating said steps of calculating said waveforms and derivative function waveforms, time shifting said waveforms and said derivative waveforms, time adjusting said time-shifted waveforms and derivative waveforms until said differences determined in step (h) reaches a minimum.

10. The method as defined in claim 9 further comprising performing said steps of time shifting, time adjusting and determining said difference for a plurality of pairs of axial receiver locations.

11. The method as defined in claim 10 further comprising repeating said steps of adjusting said initial value of velocity said initial value of subtended angle and said initial value of difference in velocity and repeating said steps of time shifting, time adjusting and determining said difference until a sum of said differences at all of said plurality of pairs of axial positions reaches a minimum.

12. The method as defined in claim 9 wherein said step of adjusting said initial values comprises minimizing a value of an objective function.

13. The method as defined in claim 12 wherein minimizing said value of said objective function comprises using a very fast simulated annealing algorithm.

14. The method as defined in claim 9 further comprising measuring said orientation of said one of said transmitters with respect to a geographic reference and calculating said orientation of said fast shear waves and said slow shear waves with respect to said geographic reference by determining said subtended angle.

15. The method as defined in claim 9 wherein said transmitters are oriented at right angles to each other and said arrays of receivers are oriented at right angles to each other.

16. The method as defined in claim 9 further comprising improving resolution of determination of said difference in velocity between said slow shear waves and said fast shear waves by calculating an average value of said difference within an axial span between one of said transmitters and a closest one of said axial receiver positions, and revising said average value each time said value of said difference in velocities is determined.

17. A method for determining orientations and velocities of slow shear waves and fast shear waves in an azimuthally anisotropic earth formation by processing signals from a well logging instrument including a dipole acoustic transmitter and dipole receivers at axially spaced apart positions from said transmitter, a first array of said receivers oriented axially parallel to said transmitter, a second array of said receivers oriented axially perpendicular to said transmitter, said method comprising:

a) selecting an initial value of an angle subtended between said orientation of said fast shear waves and said orientation of said transmitters;

b) calculating a waveform of a fast principal wave and a slow principal wave at first and at second selected axial receiver positions from said initial value of said angle and from acoustic signals received at said axial positions, said received signals corresponding to each combination of receiver and transmitter orientations at each of said first and said second axial positions;

c) selecting an initial value of said velocity of said slow shear waves, and time shifting said calculated waveforms of said slow principal wave from said first axial position by an amount of time corresponding to axial distance between said first and said second axial receiver positions and said selected initial value of velocity;

d) selecting an initial value of difference in velocity between said initial velocity of said slow shear waves and said velocity of said fast shear waves, and time adjusting said time-shifted slow principal wave by a time value corresponding, to said initial value of difference in said velocities, and an axial spacing from said one of said transmitters to said first axial position;

e) determining a difference between said time-adjusted slow principal wave and said, calculated fast principal wave previously calculated for said first axial position; and f) adjusting said initial value of said velocity of said slow shear waves, said initial value of said difference in velocity and said initial value of said subtended angle, and repeating said steps of calculating said waveforms, time shifting said waveforms, time adjusting said time-shifted waveforms until said difference determined in step (e) reaches a minimum.

18. The method as defined in claim 17 further comprising performing said steps of time shifting, time adjusting and determining said difference for a plurality of pairs of axial receiver locations.

19. The method as defined in claim 18 further comprising repeating said steps of adjusting said initial value of velocity said initial value of subtended angle and said initial value of difference in velocity and repeating said steps of time shifting, time adjusting and determining said difference until a sum of said differences at all of said plurality of pairs of axial positions reaches a minimum.

20. The method as defined in claim 17 wherein said step of adjusting said initial values comprises minimizing a value of an objective function.

21. The method as defined in claim 20 wherein said objective function comprises a very fast simulated annealing algorithm.

22. The method as defined in claim 17 further comprising measuring said orientation of said one of said transmitters with respect to a geographic reference and calculating said orientation of said fast velocity and said slow velocity with respect to said geographic reference by determining said subtended angle.

23. The method as defined in claim 17 further comprising improving resolution of determination of said difference in velocity between said slow shear waves and said fast shear waves by calculating an average value of said difference within an axial span between one of said transmitters and a closest one of said axial receiver positions, and revising said average value each time said value of said difference in velocities is determined.

24. A method for determining orientations and velocities of slow shear waves and fast shear waves in an azimuthally anisotropic earth formation by processing signals from a well logging instrument including dipole acoustic transmitters and dipole receivers at axially spaced apart positions from said transmitters, said receivers oriented axially parallel to one of said transmitter, said receivers oriented axially perpendicular to another one of said transmitter, said method comprising:

a) selecting an initial value of an angle subtended between said orientation of said fast shear waves and said orientation of said transmitters;

b) calculating a waveform of a fast principal wave and a slow principal wave at first and at second selected axial receiver positions from said initial value of said angle and from acoustic signals received at said axial positions, said received signals corresponding to each combination of receiver and transmitter orientations at each of said first and said second axial positions;

c) scaling said waveforms of said fast principal waves and said slow principal wave by their respective RMS amplitudes;

d) selecting an initial value of said velocity of said slow shear waves, and time shifting said calculated waveforms of said RMS scaled slow principal wave from said first axial position by an amount of time corresponding to axial distance between said first and said second axial receiver positions and said selected initial value of velocity;

e) selecting an initial value of difference in velocity between said initial velocity of said slow shear waves and said velocity of said fast shear waves, and time adjusting said scaled time-shifted slowest principal wave by a time value corresponding to said initial value of difference in said velocities, said initial selected value of said velocity of said slowest waves and a difference in axial spacing from said one of said transmitters between said first axial position and said second axial position;

f) determining a difference between said time-adjusted scaled slow principal wave and said calculated RMS scaled fast principal wave previously calculated for said first axial position; and g) adjusting said initial value of said velocity of said slow shear waves, said initial value of said difference in velocity and said initial value of said subtended angle, and repeating said steps of calculating said waveforms, scaling said waveforms, time shifting said waveforms, time adjusting said time-shifted waveforms until said difference determined in step (f) reaches a minimum.

25. The method as defined in claim 24 further comprising performing said steps of time shifting, time adjusting and determining said difference for a plurality of pairs of axial receiver locations.

26. The method as defined in claim 24 further comprising repeating said steps of adjusting said initial value of velocity said initial value of subtended angle and said initial value of difference in velocity and repeating said steps of time shifting, time adjusting and determining said difference until a sum of said differences at all of said plurality of pairs of axial positions reaches a minimum.

27. The method as defined in claim 24 wherein said step of adjusting said initial values comprises minimizing a value of an objective function.

28. The method as defined in claim 27 wherein said objective function comprises a very fast simulated annealing algorithm.

29. The method as defined in claim 24 further comprising measuring said orientation of said one of said transmitters with respect to a geographic reference and calculating said orientation of said fast shear waves and said slow shear waves with respect to said geographic reference by determining said subtended angle.

30. The method as defined in claim 24 further comprising improving resolution of determination of said difference in velocity between said slow shear waves and said fast shear waves by calculating an average value of said difference within an axial span between one of said transmitters and a closest one of said axial receiver positions, and revising said average value each time said value of said difference in velocities is determined.

* * * * *